(12) United States Patent
Sandoval et al.

(10) Patent No.: US 8,818,712 B2
(45) Date of Patent: Aug. 26, 2014

(54) MARITIME PATH DETERMINATION

(75) Inventors: Juan E. Sandoval, St. Petersburg, FL (US); Nicholas I. Sapankevych, Clearwater, FL (US); Sara R. Lemley, Clearwater, FL (US)

(73) Assignee: Raytheon Company, Waltham, MA (US)

( * ) Notice: Subject to any disclaimer, the term of this patent is extended or adjusted under 35 U.S.C. 154(b) by 663 days.

(21) Appl. No.: 13/073,097

(22) Filed: Mar. 28, 2011

(65) Prior Publication Data

US 2012/0253669 A1 Oct. 4, 2012

(51) Int. Cl.
*G01C 21/34* (2006.01)

(52) U.S. Cl.
USPC ........... 701/411; 701/409; 701/410; 701/435; 701/448; 701/461; 701/467; 701/527; 701/532; 701/533

(58) Field of Classification Search
CPC ........... G01C 21/3446; G01C 21/3407; G01C 21/005; G01C 21/165; G01C 21/203; G01C 21/20; G01C 21/00; G01C 21/22; G05D 1/0223; G05D 1/0217; G05D 2201/0209
See application file for complete search history.

(56) References Cited

U.S. PATENT DOCUMENTS

| | | | |
|---|---|---|---|
| 6,122,572 A * | 9/2000 | Yavnai | 701/23 |
| 6,356,911 B1 | 3/2002 | Shibuya | |
| 6,401,038 B2 * | 6/2002 | Gia | 701/301 |
| 6,430,499 B1 * | 8/2002 | Nakano et al. | 701/409 |
| 7,020,394 B2 | 3/2006 | Zhang et al. | |
| 7,209,829 B2 * | 4/2007 | Litvack et al. | 701/533 |
| 7,248,184 B2 * | 7/2007 | Gelhar et al. | 340/990 |
| 7,280,481 B2 | 10/2007 | Rong | |
| 7,496,445 B2 * | 2/2009 | Mohsini et al. | 701/434 |
| 7,593,341 B1 | 9/2009 | Buriol et al. | |
| 7,860,646 B2 * | 12/2010 | Bruce et al. | 701/423 |
| 8,121,749 B1 * | 2/2012 | Agrawal et al. | 701/23 |
| 8,332,247 B1 * | 12/2012 | Bailey et al. | 705/7.11 |
| 2006/0235610 A1 * | 10/2006 | Ariyur et al. | 701/202 |
| 2007/0198178 A1 * | 8/2007 | Trimby et al. | 701/209 |
| 2008/0312819 A1 * | 12/2008 | Banerjee | 701/202 |
| 2010/0023251 A1 * | 1/2010 | Gale et al. | 701/201 |
| 2010/0036606 A1 * | 2/2010 | Jones | 701/202 |
| 2011/0246055 A1 * | 10/2011 | Huck et al. | 701/201 |
| 2012/0065881 A1 * | 3/2012 | McIver et al. | 701/467 |

OTHER PUBLICATIONS waypoint.pdf (http://www.merriam-webster.com/dictionary/waypoint, waypoint, Oct. 4, 2013, pp. 1-3).*

(Continued)

*Primary Examiner* — Khoi Tran
*Assistant Examiner* — Bao Long T Nguyen
(74) *Attorney, Agent, or Firm* — Schwegman, Lundberg & Woessner, P.A.

(57) ABSTRACT

In certain embodiments, determining maritime paths includes accessing a feasibility matrix comprising feasibility values for locations of an area. A feasibility value indicates navigability at a location. One or more non-navigable locations represent one or more barriers. Waypoints around the barriers are determined. A cost matrix comprising cost values is calculated. A cost value indicates a distance between two points of a set of points, where the set of points comprises one or more start points, one or more end points, and the waypoints. Dijkstra's technique is applied to a selected start point and a selected end point to yield a shortest length path between the selected start point and the selected end point.

14 Claims, 3 Drawing Sheets

(56) References Cited

OTHER PUBLICATIONS shortest.pdf (http://www.thefreedictionary.com/shortest, Short, Oct. 4, 2013, pp. 1-7).*

U.S. Appl. No. 61/379,916 entitled "*Open Border CONOPS Analysis*" filed Sep. 3, 2010, inventors Juan E. Sandoval, et al., 30 pages.
U.S. Appl. No. 12/911,948 entitled "*Assigning Sensors to Paths*" filed Oct. 26, 2010, inventors Juan E. Sandoval, et al., 37 pages.

* cited by examiner

☐ WATER
▩ LAND
○ SELECTED WAYPOINT AFTER ALGORITHM
◯ END POINT
• POTENTIAL WAYPOINT BEFORE ALGORITHM

MARITIME PATH DETERMINATION

BACKGROUND

In certain situations, paths through a maritime area may be determined. Any suitable paths may be determined. For example, paths navigable by a watercraft (such as a boat or ship) may be determined. The paths may avoid barriers such as land or shallow water.

SUMMARY OF THE DISCLOSURE

In accordance with the present invention, disadvantages and problems associated with previous techniques for determining paths may be reduced or eliminated.

In certain embodiments, determining maritime paths includes accessing a feasibility matrix comprising feasibility values for locations of an area. A feasibility value indicates navigability at a location. One or more non-navigable locations represent one or more barriers. Waypoints around the barriers are determined. A cost matrix comprising cost values is calculated. A cost value indicates a distance between two points of a set of points, where the set of points comprises one or more start points, one or more end points, and the waypoints. Dijkstra's technique (or "Dijkstra's algorithm") is applied to a selected start point and a selected end point to yield a shortest length path between the selected start point and the selected end point.

Certain embodiments of the invention may provide one or more technical advantages. A technical advantage of one embodiment may be that Dijkstra's algorithm may be used to determine maritime paths. Another technical advantage of one embodiment may be that a heuristic technique may be used to determine candidate waypoints for the paths. Another technical advantage of one embodiment may be that Dijkstra's algorithm may be used to determine candidate waypoints.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
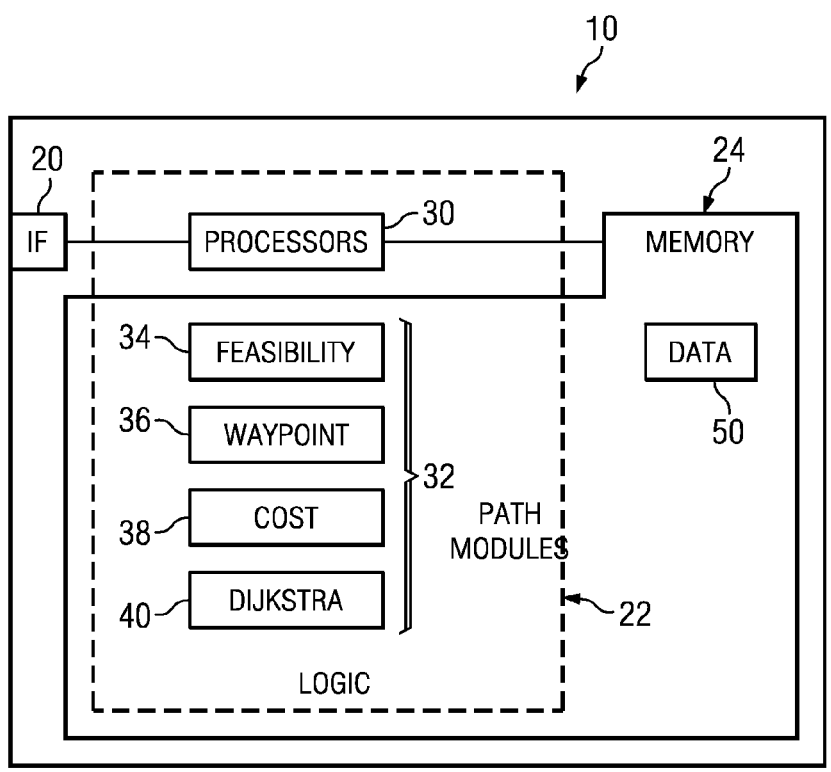
FIG. 1 illustrates an example of a system that may be used to determine maritime paths.

FIG. 1 illustrates an example of a system 10 that may be used to determine maritime paths. In the illustrated example, system 10 includes one or more interfaces (IF) 20, logic 22, and one or more memories 24. Logic 22 includes one or more processors 30 and a path module 32. Path module 32 includes a feasibility module 34, a waypoint module 36, a cost module 38, and a Dijkstra module 40. Memory 24 stores path module 32 and data 50.

In certain examples of operation, path module 32 receives a feasibility matrix comprising feasibility values for locations of an area. Each feasibility value indicates navigability at a location. One or more non-navigable locations represent one or more barriers. Waypoints around the barriers are determined. A cost matrix comprising cost values is calculated. Each cost value indicates a distance between two points of a set of points, where the set of points comprises one or more start points, one or more end points, and the waypoints. Dijkstra's technique (or algorithm) is applied to a selected start point and a selected end point to yield a shortest length path between the selected start point and the selected end point.

Data 50 indicates whether locations of an area are navigable. The area may be any suitable size or shape and may have any suitable terrain, flora, fauna, or land or water coverage. A location may be navigable if a watercraft can pass through the location. A watercraft may be a boat, vessel, or craft designed to move across or through water. In certain situations, a location may be navigable for certain watercraft, but not others.

In certain embodiments, a location with primarily water may be navigable, and a location with primarily land or shallow water may be non-navigable. In certain embodiments, data 50 may be water/land data that comprises water/land values for locations. A water/land value may indicate whether there is water or land at a location.

The water/land values may be expressed in any suitable manner. In certain embodiments, the locations of an area may be represented using a location matrix. Each entry of the location matrix may represent a particular location of the area. For example, the rows and columns of the matrix may represent coordinate axes for the area. In the example below, location matrix L is a X×Y matrix. Each (x, y) entry of the matrix may represent a (x, y) coordinate of an area. In the example below, the positive y direction may represent North and the positive x direction may represent East.

Location Matrix L

| Y | | | | | |
|---|---|---|---|---|---|
| ... | | | | | |
| 3 | | | | | |
| 2 | | | | | |
| 1 | | | | | |
| 0 | | | | | |
| y/x | 0 | 2 | 3 | ... | X |

A water/land matrix may be used to present the water/land values of locations. For example, the water/land value corresponding to location (x, y) is placed in entry (x, y) of the water/land matrix. In the illustrated example, the water/land matrix W starts from a 5×5 location matrix and includes the water/land values for the locations. A "0" indicates land, and a "1" indicates water.

Water/Land Matrix W

| 5 | 0 | 0 | 0 | 0 | 0 |
|---|---|---|---|---|---|
| 4 | 0 | 1 | 1 | 1 | 1 |
| 3 | 0 | 1 | 1 | 1 | 0 |

| -continued | | | | | |
|---|---|---|---|---|---|
| 2 | 0 | 1 | 1 | 0 | 0 |
| 1 | 0 | 0 | 0 | 0 | 0 |
| 0 | 0 | 0 | 0 | 0 | 0 |
| y/x | 0 | 2 | 3 | 4 | 5 |

Feasibility module 34 calculates a feasibility matrix. A feasibility matrix comprises feasibility values for locations of an area. Each feasibility value indicates navigability at a location. One or more non-navigable locations may represent a non-navigable barrier.

A feasibility matrix may be calculated in any suitable manner. In certain embodiments, a water/land matrix comprises water/land values that indicate whether there is water or land at locations. If a water/land value indicates there is water at a location, the feasibility value for the location is set as navigable. If a water/land value indicates there is land at a location, the feasibility value for the location is set as non-navigable.

Waypoint module 36 determines waypoints around one or more barriers. A waypoint may be an intermediate point that may be used in a path to avoid a barrier. A waypoint is located at a particular location and may be expressed in a coordinate system compatible with that of the feasibility matrix.

Waypoints may be determined in any suitable manner. In certain embodiments, a heuristic technique may be used to determine waypoints. One or more heuristic rules may be used to select waypoints. As an example, waypoints that are closer to the direction pointing towards an end point may be selected. That is, if selection of a first way point points a path closer to an end point than selection of a second end point, the first end point may be selected. As another example, redundant waypoints may be avoided.

As yet another example, waypoints that are at least a minimum distance from one or more barriers may be selected. Any suitable minimum distance may be used, for example, a minimum distance in one of the following ranges, 50 to 100, 100 to 200, or greater than 200 feet (ft). As another example, waypoints that are in between two or more barriers may be selected. These waypoints may allow paths to maneuver between barriers.

In certain embodiments, Dijkstra's technique (or algorithm) may be used to determine waypoints. In the embodiments, candidate waypoints surrounding at least one barrier are created. Candidate waypoints may be created in any suitable manner. In certain embodiments, an initial set of candidate waypoints is created at an initial distance from the barrier. The following is repeated for a predetermined number of iterations: creating a current set of candidate waypoints at a current distance from the barrier, where the current distance is greater than a previous distance from the barrier. An example of determining waypoints using Dijkstra's technique (or algorithm) is described in more detail with reference to FIG. 3.

Any suitable number of iterations may be used, such as a number in one of the following ranges, 1 to 5, 5 to 10, or greater than 10. Any suitable distance may be used, such as a distance in one of the following ranges, 50 to 100, 100 to 200, or greater than 200 ft. The distances used at different iterations may be the same or different. In the embodiments, Dijkstra's technique (or algorithm) is applied to candidate start points and the candidate waypoints to yield one or more paths. Any candidate waypoint not used in any of the paths is discarded.

Cost module 38 calculates a cost matrix comprising cost values. Each cost value indicates a distance between two points of a set of points, where the set of points comprises one or more start points, one or more end points, and the waypoints. A distance may be a geographical distance between the locations of points. A start point is a starting point for a path, and an end point is an ending point for a path.

The cost matrix may be calculated in any suitable manner. In certain embodiments, cost module 38 may determine the locations of the points in a coordinate system and then apply a distance function to the coordinates to determine the distance between the points. The cost matrix may be expressed in any suitable manner. In the illustrated example, Cost Matrix C provides the distance between points i and j, i,j=A, B, . . . , E.

Cost Matrix C

| | | | j | | |
|---|---|---|---|---|---|
| i | A | B | C | D | E |
| A | 0 | 5 | 3 | 3 | 2 |
| B | — | 0 | 2 | 3 | 4 |
| C | — | — | 0 | 4 | 3 |
| D | — | — | — | 0 | 3 |
| E | — | — | — | — | 0 |

Dijkstra module 40 applies Dijkstra's technique (or algorithm) to a start point and an end point to yield a shortest length path between the points. Dijkstra module 40 may convert a cost matrix to a graph in order to apply Dijkstra's technique. Dijkstra's algorithm (or Dijkstra's technique) is a graph search algorithm that solves the shortest path problem for a graph with nonnegative edge path costs to yield a shortest path.

In certain embodiments, Dijkstra's algorithm may be performed in the following manner. In the embodiments, the distance of point Y is the distance from the start point to Y.

1. Record a distance value to every point. For example, set the distance value to zero for the start point and to infinity for the other points.

2. Mark all points as unvisited. Set the start point as the current point.

3. For the current point, calculate the tentative distance to unvisited neighbor points. For example, if the current point A has distance of x, and the distance between points A and B is y, the distance to B through A will be x+y. If the tentative distance is less than the previously recorded distance, record the tentative distance as the new distance. After distances have been recorded for the neighbor points, mark the neighbor points as visited.

4. If there is an unvisited point, set the unvisited point with the shortest distance from the start point as the next current point and continue from step 3.

5. If there are no unvisited points, finish.

Path module 32 may determine paths for any suitable situation. For example, path module 32 may determine threat paths to ports, critical infrastructures, or borders and responder paths from responder posts floating or stationary on coast to predetermined intercept points along threat paths. As another example, path module 32 may determine paths through airspace navigable by aircraft.

Figure 2A:
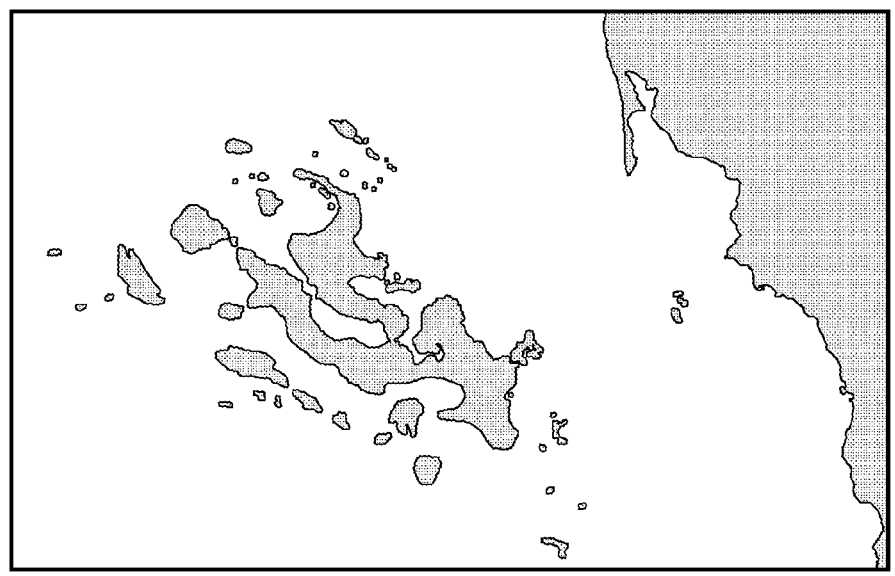
FIGS. 2A through 2C illustrate an example of a method for determining a maritime path.
Figure 2B:
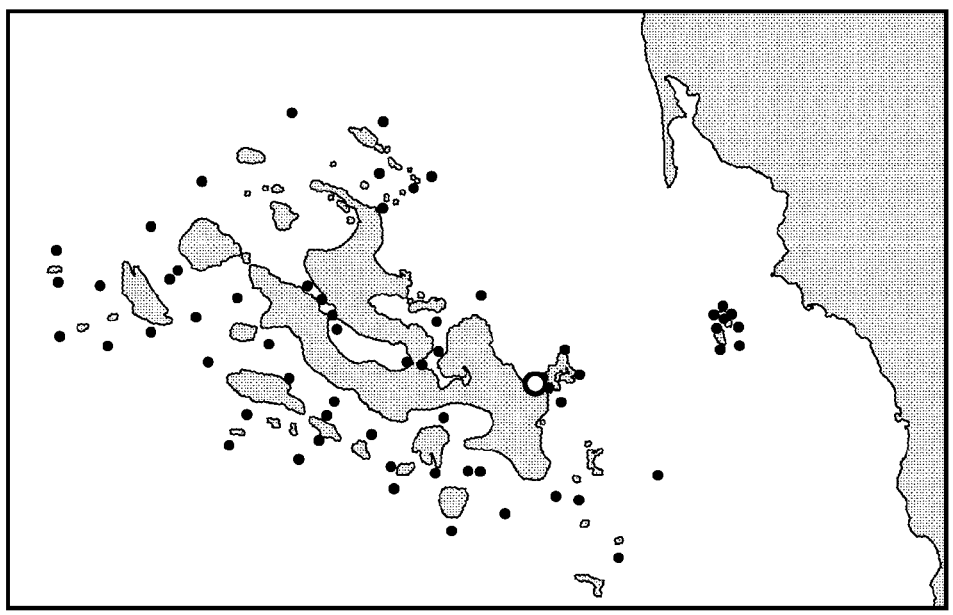
Figure 2C:
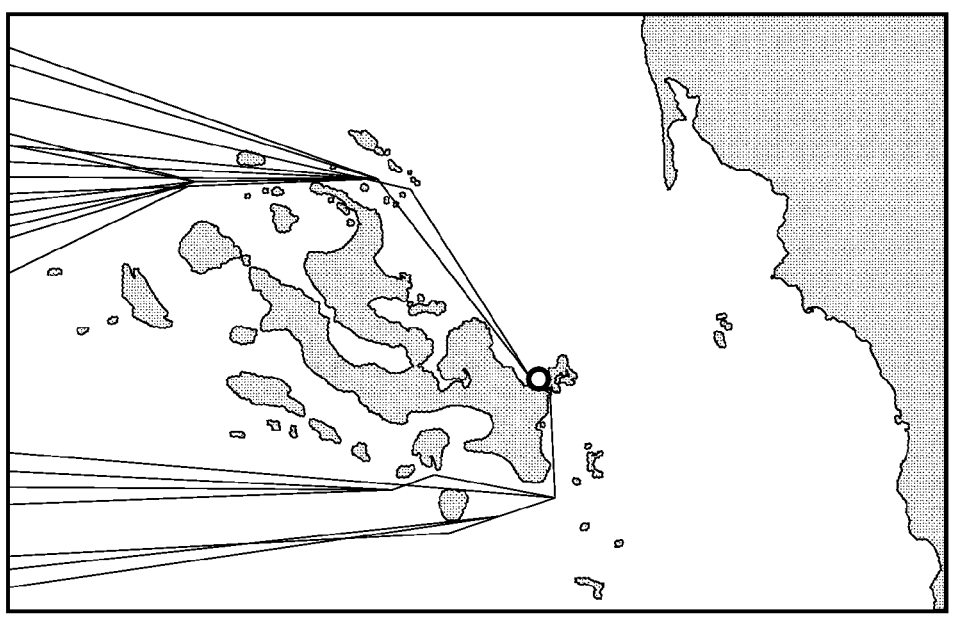

FIGS. 2A through 2C illustrate an example of a method for determining a maritime path. FIG. 2A illustrates a water/land matrix with water/land values indicating whether there is water or land at locations of an area. A feasibility matrix may be determined from the water/land matrix. FIG. 2B illustrates waypoints determined for the area. An end point has also been selected. A cost matrix may be calculated for the points. FIG. 2C illustrates paths determined by application of Dijkstra's algorithm.

Figure 3:
FIG. 3 illustrates an example of a method for determining waypoints using Dijkstra's technique (or algorithm)

FIG. 3 illustrates an example of determining waypoints using Dijkstra's technique (or algorithm). In the example, an area of interest is created around a barrier. An initial set of candidate waypoints is created 100 ft from the barrier. The following is repeated for two iterations: creating a current set of candidate waypoints at a current distance from the at least one barrier, the current distance greater than a previous distance by 100 ft. That is, a second set is created at a distance of 200 ft, and a third set is created at a distance of 300 ft.

Start points at the edge of the area of interest may be selected. Dijkstra's technique may be applied to the start points. Candidate waypoints that are not used in any path are discarded and not used as waypoints.

Figure 4:
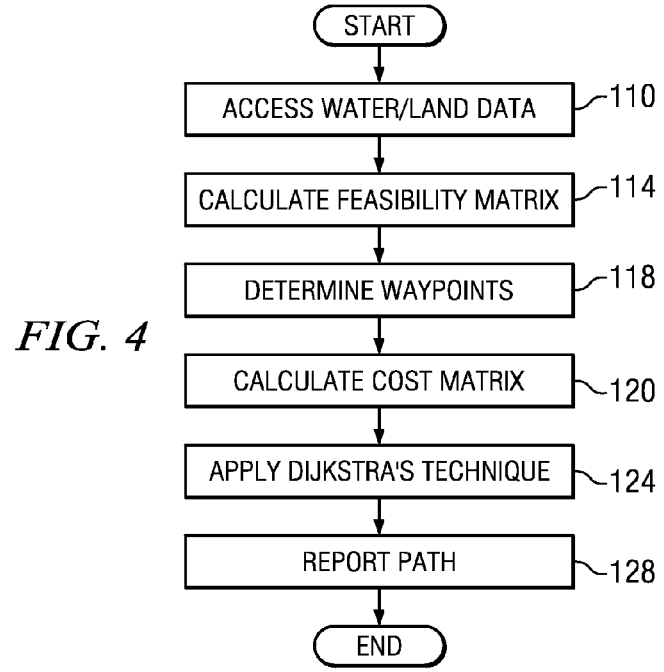
FIG. 4 illustrates an example of a method for determining maritime paths.

FIG. 4 illustrates an example of a method for determining maritime paths. The method may be performed by path module 32 of system 10. The method begins at step 110, where path module 32 accesses water/land data 50. Water/land data 50 indicates whether there is water or land at locations of an area. Feasibility module 34 calculates a feasibility matrix from the water/land data 50 at step 114. The feasibility matrix indicates whether the locations are navigable.

Waypoints are determined at step 118 by waypoint module 36. Waypoint module 36 may use a heuristic or Dijkstra technique to determine the waypoints. A cost matrix is calculated at step 38. The cost matrix indicates the distances between points, such as start points, end points, and waypoints.

Dijkstra's technique is applied to start and end points at step 124 to yield a shortest path. The path is reported at step 128. The method then ends.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of feasibility module 34 and cost module 38 may be performed by one component, or the operations of Dijkstra module 40 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses may be coupled by any suitable communication network. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
  accessing a feasibility matrix comprising a plurality of feasibility values for a plurality of locations of an area, each feasibility value indicating navigability at a location, one or more non-navigable locations representing one or more barriers;
  determining a plurality of waypoints around the one or more barriers;
  calculating a cost matrix comprising a plurality of cost values, each cost value indicating a distance between two points of a set of points, the set of points comprising one or more start points, one or more end points, and the plurality of waypoints;
  applying Dijkstra's technique to a selected start point and a selected end point to yield a shortest length path between the selected start point and the selected end point;
  wherein the determining the plurality of waypoints includes:
    creating a plurality of candidate waypoints surrounding at least one barrier, the at least one barrier associated with one or more candidate start points;
    applying Dijkstra's technique to the one or more candidate start points to yield one or more paths; and
    discarding any candidate waypoints not used in any of the one or more paths; and
  wherein the creating the plurality of candidate waypoints includes:
    creating an initial set of candidate waypoints at an initial distance from the at least one barrier; and repeating the following for a predetermined number of iterations:
    creating a current set of candidate waypoints at a current distance from the at least one barrier, the current distance greater than a previous distance from the at least one barrier.

2. The method of claim 1, further comprising calculating the feasibility matrix by:
    accessing a water/land data comprising a plurality of water/land values for the plurality of locations, each water/land value indicating whether there is water or land at a location;
    if a water/land value indicates there is water at a location, setting the feasibility value for the location as navigable; and
    if a water/land value indicates there is land at a location, setting the feasibility value for the location as non-navigable.

3. The method of claim 1, the determining the plurality of waypoints further comprising:
    selecting one or more waypoints that are closer to the direction towards at least one end point.

4. The method of claim 1, the determining the plurality of waypoints further comprising:
    selecting one or more waypoints that are at least a minimum distance from the one or more barriers.

5. The method of claim 1, the determining the plurality of waypoints further comprising:
    selecting one or more waypoints that are in between two or more barriers.

6. A system comprising:
    one or more memories operable to store a feasibility matrix comprising a plurality of feasibility values for a plurality of locations of an area, each feasibility value indicating navigability at a location, one or more non-navigable locations representing one or more barriers; and
    one or more processors operable to:
        determine a plurality of waypoints around the one or more barriers;
        calculate a cost matrix comprising a plurality of cost values, each cost value indicating a distance between two points of a set of points, the set of points comprising one or more start points, one or more end points, and the plurality of waypoints;
        apply Dijkstra's technique to a selected start point and a selected end point to yield a shortest length path between the selected start point and the selected end point;
        wherein the determining the plurality of waypoints includes:
            creating a plurality of candidate waypoints surrounding at least one barrier, the at least one barrier associated with one or more candidate start points;
            applying Dijkstra's technique to the one or more candidate start points to yield one or more paths; and
            discarding any candidate waypoints not used in any of the one or more paths; and
        wherein the creating the plurality of candidate waypoints includes:
            creating an initial set of candidate waypoints at an initial distance from the at least one barrier; and
            repeating the following for a predetermined number of iterations:
                creating a current set of candidate waypoints at a current distance from the at least one barrier, the current distance greater than a previous distance from the at least one barrier.

7. The system of claim 6, the one or more processors further operable to calculate the feasibility matrix by:
    accessing a water/land data comprising a plurality of water/land values for the plurality of locations, each water/land value indicating whether there is water or land at a location;
    if a water/land value indicates there is water at a location, setting the feasibility value for the location as navigable; and
    if a water/land value indicates there is land at a location, setting the feasibility value for the location as non-navigable.

8. The system of claim 6, the determining the plurality of waypoints further comprising: selecting one or more waypoints that are closer to the direction towards at least one end point.

9. The system of claim 6, the determining the plurality of waypoints further comprising:
    selecting one or more waypoints that are at least a minimum distance from the one or more barriers.

10. The system of claim 6, the determining the plurality of waypoints further comprising:
    selecting one or more waypoints that are in between two or more barriers.

11. One or more non-transitory computer readable media comprising logic when executed operable to:
    access a feasibility matrix comprising a plurality of feasibility values for a plurality of locations of an area, each feasibility value indicating navigability at a location, one or more non-navigable locations representing one or more barriers;
    determine a plurality of waypoints around the one or more barriers;
    calculate a cost matrix comprising a plurality of cost values, each cost value indicating a distance between two points of a set of points, the set of points comprising one or more start points, one or more end points, and the plurality of waypoints;
    apply Dijkstra's technique to a selected start point and a selected end point to yield a shortest length path between the selected start point and the selected end point;
    wherein the determine the plurality of waypoints includes:
        creating a plurality of candidate waypoints surrounding at least one barrier, the at least one barrier associated with one or more candidate start points;
        applying Dijkstra's technique to the one or more candidate start points to yield one or more paths; and
        discarding any candidate waypoints not used in any of the one or more paths; and
    wherein the create the plurality of candidate waypoints includes:
        creating an initial set of candidate waypoints at an initial distance from the at least one barrier; and
        repeating the following for a predetermined number of iterations:
            creating a current set of candidate waypoints at a current distance from the at least one barrier, the current distance greater than a previous distance from the at least one barrier.

12. The media of claim 11, the logic further operable to calculate the feasibility matrix by:
    accessing a water/land data comprising a plurality of water/land values for the plurality of locations, each water/land value indicating whether there is water or land at a location;

if a water/land value indicates there is water at a location, setting the feasibility value for the location as navigable; and if a water/land value indicates there is land at a location, setting the feasibility value for the location as non-navigable.

13. The media of claim 11, the determining the plurality of waypoints further comprising:

selecting one or more waypoints that are closer to the direction towards at least one end point.

14. The media of claim 11, the determining the plurality of waypoints further comprising:

selecting one or more waypoints that are at least a minimum distance from the one or more barriers.

* * * * *

UNITED STATES PATENT AND TRADEMARK OFFICE
CERTIFICATE OF CORRECTION

PATENT NO. : 8,818,712 B2  
APPLICATION NO. : 13/073097  
DATED : August 26, 2014  
INVENTOR(S) : Sandoval et al.

Page 1 of 1

It is certified that error appears in the above-identified patent and that said Letters Patent is hereby corrected as shown below:

In the Specification

In column 5, line 28, delete "38" and insert --120--, therefor

Signed and Sealed this
Thirty-first Day of March, 2015

Michelle K. Lee
*Director of the United States Patent and Trademark Office*